United States Patent Office 3,681,248
Patented Aug. 1, 1972

3,681,248
WATER SOLUBLE ENTRAPPING OF A FRAGRANCE
Francis E. Gould, Princeton, and Thomas H. Shepherd, Hopewell, N.J., assignors to National Patent Development Corporation, New York, N.Y.
No Drawing. Original application June 13, 1969, Ser. No. 833,182, now Patent No. 3,576,760, dated Apr. 27, 1971. Divided and this application Sept. 9, 1970, Ser. No. 70,939
Int. Cl. C11d 3/50
U.S. Cl. 252—89
6 Claims

ABSTRACT OF THE DISCLOSURE

Materials are entrapped in water soluble hydroxyalkyl acrylate or methacrylate polymers to provide ready sources of the material by the deletion of water. Thus, there can be entrapped drugs, pesticides, flavoring agents and fragrances.

---

This application is a division of application Ser. No. 833,182, filed June 13, 1969, now Pat. 3,576,760, Apr. 27, 1971.

The present invention relates to the preparation of ingredients entrapped in a water soluble polymer.

Linear hydroxyalkyl acrylate and methacrylate soluble in solvents other than water are disclosed in our copending application Ser. No. 654,044, filed July 5, 1967. These polymers, however, are not soluble in water as the sole solvent.

Frequently it is desirable, however, to entrap materials in a water soluble polymer. Thus, the advantages of a water soluble polymer become apparent in certain uses, e.g., in the entrapment of flavors, perfumes, etc. wherein the polymer carrying the entrapped material is added to water, as for example in a soft drink or in a detergent composition. In these cases it is desirable to have the polymer dissolve to avoid the presence of suspended granules which can detract from the appearance in a drink or leave a dusty residue on clothing, dishes, etc. in the case of a detergent.

The water soluble polymers also are advantageous in trapping certain species such as enzymes which will not tolerate alcohol or solvents other than water.

It is an object of the present invention to prepare novel compositions containing materials entrapped in a water soluble polymer.

Another object is to protect materials from attack by atmospheric oxygen.

A further object is to devise a means for contacting non-water soluble materials with an aqueous environment.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by employing water soluble hydrophilic polymers of hydroxyalkyl acrylates and methacrylates as entrapping agents. Thus there are employed copolymers of hydroxyethyl acrylate, hydroxypropyl acrylate, hydroxyethyl methacrylate or hydroxypropyl methacrylate with 0.5 to 20% of a water solubilizing copolymerizable monomer. The copolymerizable monomer should be present in amount sufficient to be sure that the polymer is completely soluble in water. Of course, mixtures of hydroxyalkyl acrylates and methacrylates can be employed. Thus, while the hydroxyalkyl methacrylate esters are preferred as starting material up to about 40% by weight of hydroxyalkyl acrylate can be used in the hydroalkyl methacrylate containing mixture of monomers.

The polymers employed in the present invention being water soluble distinguish not only from those in our prior application but also distinguish from the cross linked hydroxyalkyl methacrylate polymers and the like shown in Wichterle Pat. 3,220,960 for example, since the Wichterle polymers is not soluble in any solvent, but only swellable. The polymers employed in the present invention are not only soluble in water but are also soluble in many polar solvents.

The polymers employed in the present invention have the advantage over conventional water soluble polymers such as polyethylene oxides, polyvinyl alcohol, cellulose ethers, etc. in the barrier properties of the dry polymer. The polymers of the present invention give superior protection to entrapped species from atmospheric oxygen and are superior in preventing diffusion and loss of the entrapped species.

The solubilizing comonomer in polymerizing the hydroxyalkyl acrylate or methacrylate can be either (1) an ammonium or alkali metal (e.g., sodium or potassium) salt of a polymerizable ethylenically unsaturated (or nonbenzenoid unsaturated) organic acid or (2) a strong acid salt of a polymerizable ethylenically unsaturated (or nonbenzenoid unsaturated) amino containing monomer.

Examples of organic acids for making the ammonium and alkali metal salts include acrylic acid, methacrylic acid, maleic acid, fumaric acid, itaconic acid, aconitic acid, cinnamic acid, crotonic acid, cyclohexene, carboxylic acid, propiolic acid, mesaconic acid, citraconic acid, vinyl sulfonic acid, p-vinylbenzenesulfonic acid, partial esters such as mono 2-hydroxyethyl citraconate, mono 2-hydroxypropyl itaconate, mono 2-hydroxyethyl itaconate, mono 2-hydroxypropyl citraconate, mono 2-hydroxyethyl maleate, mono 2-hydroxypropyl fumarate, mono methyl itaconate, monoethyl itaconate, mono methyl Cellosolve itaconate (methyl Cellosolve is the monomethyl ether of diethylene glycol), mono methyl Cellosolve maleate, mono-2-hydroxyethyl aconitate.

Examples of strong acid salts of polymerizable amino containing monomers are the hydrochloric, hydrobromic, sulfuric acid, nitric acid, phosphonic acid, benzene sulfonic acid, naphthalene sulfonic acid, trichloroacetic acid, and p-toluene sulfonic acid salts of diethylaminoethyl methacrylate, dimethyl aminoethyl methacrylate, monomethylaminoethyl methacrylate, t-butylaminoethyl methacrylate, p-aminostyrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-2-hydroxypropyl acrylate, 3-(dimethylaminoethyl)-2-hydroxypropyl methacrylate, 2 - aminoethyl acrylate, 2-aminoethyl methacrylate. The alkylaminoethyl acrylates and methacrylates are preferred in group (2).

A portion (up to 40% of total monomers) of the hydroalkyl acrylate or methacrylate can be replaced by acrylamide, methacrylamide, N-isopropyl methacrylamide, N-methyl acrylamide, N-methyl methacrylamide, N-(2-hydroxyethyl) acrylamide, N - (2 - hydroxyethyl) methacrylamide.

When materials which are not water soluble are desired to be entrapped this can be accomplished providing they are soluble in other solvents in which the copolymers of the present invention are soluble. Such solvents include methanol, ethanol, isopropanol, n-propanol, methyl Cellosolve (monomethyl ether of diethylene glycol), ethyl Cellosolve, monoethyl ether of diethylene glycol, dioxene-water mixtures, pyridine, dimethyl formamide, dimethyl sulfoxide, tetrahydrofurfuryl alcohol and mixtures of any of the above-mentioned solvents with each other or water.

On contact of such water insoluble entrapped materials with water, the polymer dissolves, leaving the entrapped species exposed and in contact with the aqueous environment. This can be taken advantage of in applying pesticides to the soil. For example, the entrapped pesticide can be applied in the dry form to the top of the soil or it can be embedded in the soil and will be released as a result of rain or artificial watering.

Usually 0.1 to 35% of the entrapped material is employed based on the weight of the polymer.

The water soluble polymers of the present invention are infinitely soluble in water, although at concentrations above 30% solution viscosity rises sharply.

Solubility of the polymers is pH dependent. For example, polymers containing salts of carboxylic or sulfonic acids as part of the structure will not be soluble at a pH below about 3.5 and polymers containing amine salts as part of the structure will not be soluble at a pH above about 8.5.

Thus, for release of fragrance in common alkaline detergents, e.g., soap, sodium decylbenzene sulfonate, sodium lauryl sulfate, sodium dodecylbenzene sulfonate, sodium propyl naphthalene sulfonate, sodium di(2-ethylhexyl) sulfosuccinate, sodium alkyl benzene sulfonates having 14 to 18 carbon atoms in the alkyl group or the like (i.e., anionic detergents) polymers containing carboxylate salt groups are primarily useful whereas for cationic detergents, e.g., trimethylbenzylammonium chloride, 1 - lauryl - 3 - ethylbenzotriazolium bromide, trimethyl stearamidoethyl ammonium sulfate and lauryl trimethyl ammonium chloride. These polymers containing amine salt groups are preferable. Either type of polymer can be used with equal facility with non ionic detergents such as p-isooctylphenol condensed with 10 ethylene oxide units, polyoxyethylene sorbitan monoleate, tertiary dodecyl polyethylene glycol thioether, tri(polyoxyethylene sorbitan monopalmitate), Spans, Tweens, etc., providing there is not present another ingredient which causes substantial pH shift away from percent.

Any common fragrance or food flavor can be entrapped, e.g. orange oil, citral, coffee, tea, lemon oil, synthetic lemon-lime flavor, strawberry flavor, vanilla, biacetyl, anise, lilac fragrance, pine fragrance, peppermint oil, oil of orchids essence, anethole, ethyl propionate, ethyl acetate, acetaldehyde, menthol and spearmint.

In addition to fragrances and food flavors, there can be entrapped in the water soluble polymers pesticides including bactericides, fungicides, insecticides and nematocides, enzymes and drugs.

Examples of bactericides include trimethyl benzyl ammonium chloride, cetyl pyridinium chloride, hexachlorophene, streptomycin, salicylic acid, penicillin, Aureomycin, chloromycetin, Merthiolate, sulfanilamide, sulfathiazole, fungicides including methyl-1-(butylcarbamoyl)-2-benzimidazole carbamate,
N-trichloromethylthio-4-cyclohexene 1,2-dicarboximide,
methyl mercury 2,3-dihydroxypropyl mercaptide,
methyl mercury acetate,
N-(ethylmercury)-p-toluenesulfonanilide,
chloranil,
1,4-dichloro-2,5-dimethoxybenzene,
copper carbonate,
copper oleate,
basic cupric chloride,
cuprous oxides 3-[2-(3,5-dimethyl-2-oxocyclohexyl)-2-hydroxyethyl]glutarimide,
2,4,5,6-tetrachloroisophthalonitrile,
tetrahydro-3,5-dimethyl-2H-1,3,5-thiadiazine-2-thione,
2,6-dichloro-4-nitroaniline,
p-dimethylaminobenzenediazo sodium sulfonate,
bis(n-propylsulfonyl) ethylene (B–1843),
2,3-dichloro-1,4-naphthoquinone,
cis-N-[1,1,2,2-tetrachloroethyl)thio]-4-cyclohexene-1,2-dicarboximide,
coordination product of zinc and maganese ethylene bisdithiocarbamate (Dithane M–45),
mixture of nickel sulfate and manganous ethylene bis[dithiocarbamate] (Dithane S–31),
dodecylguanidine acetate,
2,4-dichloro-6-(o-chloroanilino)-s-triazine,
sodium ethylmercurithiosalicylate,
3,4,5,6,7,7-hexachloro-N-(ethyl mercuri)-1,2,3,6-tetrahydro-3,6-endo-methanophthalimide,
ferric dimethyl dithiocarbamate,
N-(trichloro-methylthio) phthalimide,
2-heptadecyl-imidazoline acetate,
Griseofulvin,
hexachlorobenzene,
1-chloro-2-nitropropane,
manganous ethylene bis carbamate,
3,4,5,6,7,7-hexachloro-N-(methylmercuri)-1,2,3,6-tetrahydro-3,6-endo-methanophthalimide,
mercuric chloride,
sodium methyldithiocarbamate,
6-methyl-2,3-quinoxalinedithiol cyclic-S,S-dithiocarbonate (also mites) disodium ethylenebisdithiocarbamate,
manganese dimethyl dithiocarbamate and mercaptobenzothiazole mixture (Niacide),
methyl mercury 8-hydroxyquinoline,
2-phenylphenol,
methyl mercury dicyandiamide,
phenylmercuritriethanolammonium lactate,
pentachloronitro-benzene,
phenyl-mercury urea,
3-(2-methyl-piperidino) propyl 3,4-dichlorobenzoate,
2,3-dihydro-5-carboxanilido-6-methyl-1,4-oxathiin-4-dioxide,
phenylmercuric acetate,
Polyram,
8-hydroxyquinoline sulfate,
hydroxymercuri-nitrophenol and hydroxymercurichlorophenol mixture,
sulfur,
5-ethoxy-3-trichloromethyl-1,2,4-thiadiazole,
1,2,4,5-tetrachloro-3-nitrobenzene,
bis(dimethylthiocarbamoyl) disulfide,
3,5,6-trichloro-o-anisic acid,
triphenyltin hydroxide,
2,3-dihydro-5-carboxanilido-6-methyl-1,4-oxathiin,
zinc ethylene bisdithiocarbamate,
zinc dimethyl dithiocarbamate and lauryl isoquinolium bromide.

Insecticides (or miticides) including,

O,O,O',O'-tetramethyl O,O'-thiodi-p-phenylene phosphorothioate,
isopropyl 4,4'-dichloro-benzilate,
O-[2-chloro 1-(2,5-dichlorophenyl)-vinyl] O,O-diethyl phosphorothioate,
aldrin,
allethrin,
O,O,O,O-tetrapropyl dithiopyrophosphate,
O,O-diethyl-s-[4-oxo-1,2,3-benzotriazin-3(4H)-ylmethyl]-phosphorodithioate,
O,O-dimethyl-s-[4-oxo-1,2,3-benzotriazin-3(4H)-ylmethyl]-phosphorodithioate,
dimethyl phosphate of 3-hydroxy-N-methyl-cis-crotonamide, 2-isopropoxyphenyl N-methyl carbamate,
benzene hexachloride (BHC),
dimethyl phosphate of 3-hydroxy-N,N-dimethyl-cis-crotonamide,
2-sec-butyl-4,6-dinitrophenyl-3-methyl-2-butenoate,
dimethyl 3-hydroxyglutaconate dimethyl phosphate,
dimethyl (2,2,2-trichloro-1-hydroxyethyl) phosphorate ester of butyric acid,
m-(1-methyl-butyl) phenylmethyl carbamate,
m(1-ethylpropyl) phenyl methyl carbamate,
calcium cyanide,
1-naphthyl N-methylcarbamate,
2,3-dihydro-2,2-dimethyl-7-benzofuranyl methyl carbamate,
S-[(p-chlorophenylthio)methyl]O,O-diethyl phosphorodithioate,
m[[(dimethylamino)methylene]-amino] phenyl methylcarbamate hydrochloride,
chlordane,
ethyl 4,4'-dichlorobenzilate,
N,N-dimethyl-N'-(2-methyl-4-chlorophenyl)-formamidine,
dimethyl phosphate of α-methylbenzyl 3-hydroxy-cis-crotonate,
O,O-diethyl-O-3-chloro-4-methyl-2-oxo-2H-1-benzopyran-7-ryl-phosphorothioate,
cyclic ethylene (diethoxyphosphinyl) dithiomido carbonate,
1,1-dichloro-2,2-bis(p-chlorophenyl) ethane,
DDT (1,1,1-trichloro-2,2-bis (p-chlorophenyl)ethane,
Demeton (mixture of O,O-diethyl-O-[2-(ethylthio)ethyl] phosphorothioate and O,O-diethyl-S-[2-(ethylthio)ethyl]phosphorothioate,
O,O-dimethyl-O-(2,2-dichlorovinyl phosphate (DDVP),
O,O-diethyl O-(2-isopropyl-(o-methyl-4-pyrimidyl) phosphorothioate,
O-2-chloro-4-nitrophenyl O,O-diethyl phosphorothioate,
dieldrin,
2-nitro-1,1-bis(p-chlorophenyl) butane,
2-nitro-1,1-bis-(p-chlorophenyl) propane,
tetramethyl phosphorodiamidic fluoride,
2,4-dimethylbenzyl 2,2-dimethyl-3-(2-methyl propenyl) cyclopropanecarboxylate,
4,4'-dichloro-α-methylbenzhydrol (primarily an acaricide and miticide),
4,6-dinitro-o-cyclohexylphenol,
2-sec-butyl-4,6-dinitrophenyl isopropyl carbonate (miticide),
2,3-p-dioxanedithiol-S,S-bis(O,O-diethyl phosphorodithioate),
diphenylamine,
O,O-diethyl-S-[2-(ethylthio)-ethyl]phosphorodithioate,
O,O-diethyl-O-(3,5,6-trichloro-2-pyridyl) phosphorothioate,
O-ethyl-S-phenyl-ethylphosphonodithioate 6,7,8,9,10,10-hexachloro-1,5,5a,6,9,9a-hexahydro-6,9-methano-2,4,3-benzodioxathiepin-3-oxide,
endrin,
O-ethyl-O-p-nitrophenyl phenylphosphonothioate,
2,3-quinoxaline-dithio cyclic trithiocarbamate (ovicide for spider mites),
O,O,O',O'-tetraethyl S,S-methylene biophosphorodithioate (mites),
O,O-dimethyl-O-[4-methylthio)-m-tolyl]-phosphorothioate,
2-chloro-1-(2,4,5-trichlorophenyl) vinyl dimethyl phosphate,
2,4-dichlorophenyl ester of benzene sulfonic acid,
heptachlor,
hydroxymercurichlorophenol,
N-(mercaptomethyl) phthalimide S-(O,O-dimethyl phosphorodithioate),
2-(1-methylheptyl) 4,6-dinitrophenyl crotonate,
decachlorooctahydro-1,3,4-metheno-2H-cyclobuta[cd]
pentalen-2-one-2,3,5-trimethylphenyl carbamate,
3,4,5-trimethylphenyl carbamate,
dibasic lead arsenate,
β-butoxy-β'-thiocyanodiethyl ether,
1,2,3,4,5,6-hexachlorocyclohexane gamma isomers 5,6-dichloro-2-trifluoromethylbenzimidazole-1-carboxylate (mites),
O,O-dimethyl phosphoro-dithioate of diethyl mercaptosuccinate,
4-(dimethylamino)-m-tolyl methylcarbamate,
O,O-diethyl-S-(N-ethoxycarbonyl-N-methyl-carbamoylmethyl) phosphorothiolothionate,
S-(4,6-diamino-s-triazin-2-ylmethyl) O,O-dimethyl phosphorodithioate,
4-(methylthio)-3,5-tylylmethylcarbamate,
S-methyl-N-[(methylcarbamoyl)-oxy] thioacetamidate,
2,2-bis(p-methoxyphenyl-1,1,1-trichloroethane (methoxychlor),
bromomethane,
o-[2-(ethylthio)ethyl] O,O-dimethyl phosphorothioate (Meta Systox),
O,O-dimethyl-O-p-nitrophenyl phosphorothioate,
S-[[(p-chlorophenyl)thio]methyl] O,O-dimethyl phosphorodithioate,
3-(p-bromophenyl)-1-methoxy-1-methylurea,
2-carbomethoxy-1-methylvinyl dimethyl phosphate (α isomer),
4-benzothienyl-N-methyl carbamate,
O,S-dimethyl phosphoramidi-thioate,
1,2-dibromo-2,2-dichloroethyl dimethyl phosphate,
naphthalene,
2,2-dimethyl-3-(2-methylpropenyl) cyclopropanecarboxylic ester of N-(hydroxymethyl)-1-cyclohexene-1,2-dicarboximide,
nicotine (3-(1-methyl-2-pyrrolidyl)pyridine),
o-dichlorobenzene,
p-chlorophenyl-p-chlorobenzenesulfonate (mites),
p-dichlorobenzene,
O,O-diethyl-O-p-nitro-phenyl phosphorothioate (parathion),
copper meta-arsenite copper acetate complex (Paris green),
decachlorobis(2,4-cyclopentadiene-1-yl) (mites),
1,1-dichloro-2,2-bis(p-ethylphenyl)ethane,
dibenzo 1,4-thiazine,
O,O-diethyl S-(ethylthio)-methyl phosphorodithioate,
2-chloro-2-diethylcarbamoyl-1-methylvinyl dimethyl phosphate,
piperonyl butoxide,
O-ethyl S,S-dipropyl phosphorodithioate,
pyrethrins,
O,O-dimethyl-O-(2,4,5-trichlorophenyl) phosphorothioate,
rotenone,
4-t-butyl-2-chlorophenyl O-methyl methylphosphoroamidate,
ryanodine,
sabadilla,
(5-benzyl-5-furyl) methyl-2,2-dimethyl-3-(2-methylpropenyl)-cyclopropanecarboxylate,
octamethylpyrophosphoramide,
sodium fluoride,
6(and 2)-chloro-3,4-xylylmethylcarbamate,
polychlorinated (66% Cl) terpene,
p-chlorophenyl phenyl sulfone (mites),
O,O-dimethyl O-(4-nitro-m-tolyl)-phosphorothioate,
2-methyl-2-(methylthio) propionaladehyde O-(methylcarbamoyl) oxime,
tetraethyl pyrophosphate,
4-chlorophenyl 2,4,5-trichloropenyl sulfone,
isobornyl thiocyanoacetate,
chlorinated (67–69%) camphene,
O,O-dimethyl (2,2,2-trichloro-1-hydroxyethyl) phosphonate and O,O-diethyl-O-(2-pyrozinyl) phosphorothioate.

Herbicides including
2-(ethylamino)-4-(isopropylamino)-6-(methylthio)-s-triazine,
3-amino-2,5-dichlorobenzoic acid,
3-amino-1,2,4-triazole,
ammonium sulfamate,
2-triazine,
2-chloro-4-ethylamino-6-isopropylamino-s-triazine,
polychlorobicyclopentadiene,
4-chloro-2-butynyl-m-chlorocarbanitate,
N-butyl-N-ethyl-α,α,α-trifluoro-2,6-dinitro-p-toluidine,
S-(O,O-diisopropyl phosphorodithioate) ester of N-(2-mercaptoethyl) benzenesulfonamide,
methyl m-hydroxycarbanilate,
m-methyl carbanilate,
3,5-dibromo-4-hydroxybenzonitrile,
S-ethyl diisobutylthiocarbamate,
N,N-diallyl-2-chloroacetamide,
2-chloroallyl diethyldithiocarbamate,
3-[p-(p-chlorophenoxy)phenyl]-1,1-dimethylurea,
isopropyl m-chlorocarbanilate,
calcium methanearsonate,
p-chlorophenoxy acetic acid,
S-ethyl N-ethyl-N-cyclohexylthiocarbamate,
3',4'-dichlorocyclopropanecarboxanilide,
2,4-dichlorophenoxy acetic acid and its salts, e.g. butylamine salt, and esters, e.g. isooctyl ester,
2,4,5-trichlorophenoxy acetic acid and its salts and esters,
2,2-dichloropropionic acid,
4-(2,4-dichlorophenoxybutyric acid) its salts, amine salts and esters,
dimethyl-2,3,5,6-tetrachlorophthalate,
1,3-bis(1-hydroxy-2,2,2-trichloroethyl) urea,
tris[(2,4-dichlorophenoxy) ethyl] phosphite,
S-2,3-dichloroallyl diisopropylthiocarbamate,
3,6-dichloro-o-anisic acid,
2,6-dichlorobenzo-nitrile,
2-(2,4-dichlorophenoxy) propionic acid,
N,N-dimethyl-2,2-diphenylacetamide,
diphenyl-acetonitrile,
3-(3,4-dichlorophenyl)-1,1-dimethylurea,
2-methyl-4,6-dinitrophenol sodium salt,
disodium methanearsonate,
ethylene glycol bis(trichloroacetate),
7-oxabicyclo (2,2,1) heptane-2,3-dicarboxylic acid,
S-ethyl dipropylthiocarbamate,
2-(2,4,5-trichlorophenoxy) ethyl 2,2-dichloropropionate,
diethyl dithiobis(thionoformate),
2,3,6-trichlorophenylacetic acid or sodium salt,
3-phenyl-1,1-dimethylurea,
3-phenyl-1,1-dimethylurea trichloroacetate,
1,1-dimethyl-3-(α,α,α-trifluoro-m-tolyl) urea,
2-t-butylamino-4-ethylamino-6-methylthio-s-triazine,
3,5-diiodo-4-hydroxybenzonitrile,
hexachloroacetone,
5-bromo-3-sec-butyl-6-methyluracil,
potassium cyanate,
2-chloro-2',6'-diethyl-N-(methoxymethyl) acetanilide,
3-cyclohexyl-6,7-dihydro-1H-cyclopentapyrimidine-2,4-(3H,5H)-dione,
3-(3,4-dichlorophenyl)-1-methoxy-1-methylurea,
3-(4-bromo-3-chlorophenyl)-1-methoxy-1-methylurea,
mono ammonium methyl arsenate,
2-methyl-4-chlorophenoxyacetic acid and its salts and esters,
4-(2-methyl-4-chlorophenoxy) butyric acid and its salts and esters,
2-(2-methyl-4-chlorophenoxy) propionic acid and its salts and esters,
1,2-dihydro 3,6-pyridazinedione,
S-ethyl hexahydro-1H-azepine-1-carbothioate,
3-(p-chlorophenyl)-1,1-dimethylurea,
3-(4-chlorophenyl)-1,1-dimethylurea trichloroacetate,
2,4-bis[(3-methoxypropyl)-amino]-6-methylthio-s-triazine,
monosodium acid methanearsonate,
N-1-naphthylphthalamic acid,
1-butyl-3-(3,4-dichlorophenyl)-1-methylurea,
ethyl hydrogen 1-propyl phosphonate,
4-(methylsulfonyl)-2,6-dinitro-N,N-dipropylaniline,
2,4-dichlorophenyl-p-nitrophenyl ether,
3-(hexahydro-4,7-methanoinden-5-yl)-1,1-dimethylurea,
1,1'-dimethyl-4,4'-bipyridinium dichloride or the corresponding bis (methyl sulfate),
dimethylamine salt of polychlorobenzoic acid (PBA),
pentachlorophenol,
S-propyl butylethylthiocarbamate,
4-amino-3,5,6-trichloropicotinic acid,
2,4'-dinitro-4-trifluoromethyldiphenyl ether,
2,4-bis(isopropylamino)-6-methoxy-s-triazine,
2,4-bis(isopropylamino)-6-(methylthio)-s-triazine,
2-chloro-N-isopropylacetanilide,
3,4-dichloropropionanilide,
2-chloro-4,6-bis(isopropylamino)-s-triazine,
isopropyl N-phenylcarbamate,
5-amino-4-chloro-2-phenyl-3(2H)-pyridazinone,
sodium 2-(2,4-dichlorophenoxy)-ethyl sulfate,
1-(2-methylcyclohexyl)-3-phenylurea,
2-(2,4,5-trichlorophenoxy) propionic acid and its salts and esters,
2-chloro-4,6-bis(ethylamino)-s-triazine,
sodium arsenite,
sodium chlorate,
3'-chloro-2-methyl-p-valerotoluidine,
m-(3,3-dimethyluredio) phenyl t-butylcarbamate,
dimethylamine salt of 2,3,6-trichlorobenzoic acid,
2,3,6-trichlorobenzyloxypropanol,
trichloroacetic acid,
trichlorobenzyl chloride,
3-t-butyl-5-chloro-6-methyluracil,
2,6-di-t-butyl-p-tolylmethylcarbamate,
S-2,3,3-trichloroallyl-diisopropyl thiolcarbamate,
α,α,α-trifluoro-2,6-dinitro-N,N-dipropyl-p-toluidine and
S-propyl dipropylthiolcarbamate.

Nematocides including chloropicrin (trichloronitromethane), O,O-diethyl O[p-(methylsulfinyl)phenyl] phosphorothioate, 1,2-dibromo-3-chloropropane, D-D (mixture of 1,3-dichloropropene, 3,3-dichloropropene, 1,2-dichloropropane and 2,3-dichloropropene), 1,2-dibromoethane, O-2,4-dichlorophenyl O,O-diethyl phosphorothioate, 3-bromo-1-propyne and tetrachlorothiophene. Defoliants and desiccants such as arsenic acid, dimethyl arsinic acid, calcium cyanamide, S,S,S-tributyl phosphorotrithioate, 4,6-nitrophenol-O-sec. butylphenol, 6,7-dihydrodipyrido[1,2a; 2',1'-c] pyrazinedium salts, S,S,S-tributyl phosphorotrithioite and magnesium chlorate; snail and lamprey controls, e.g. 2',5-dichloro-4'-nitrosalicylanilide.

Enzymes such as leucylpeptidase, aminopolypeptidase, β-amylase, carboxypeptidase, pepsin, trypsin, luciferase, d-amino acid oxidase, phosphorylase, papin, catalase, ascorbic acid oxidase, malt diastase, rennin, pancreatin, α-amylase, pectinase, lipase, phosphatase, pectase, urease, arginase and glyoxalase.

Unless otherwise indicated, all parts and percentages are by weight.

EXAMPLE 1

Into a 30-gallon reactor was charged 40 lbs. of hydroxyethyl methacrylate, 4 lbs. of methacrylic acid, 120 lbs. of methanol and 0.05 lb. of t-butyl peroctoate. The reactor was heated to 80° C. and allowed to stir 6 hrs. to effect polymerization. To the polymer solution thus obtained was added 2.5 lbs. of sodium methoxide dissolved in 25 lbs. of methanol. The resulting solution was added slowly to a 10-fold excess of acetone to precipitate the polymer. After drying, a yield of 36 lbs. of water soluble polymer was obtained.

EXAMPLE 2

The polymer of Example 1 was dissolved in methanol to provide a 10 weight percent solution. To the solution was added orange oil at a level of 20% of the polymer content of the solution. The solution was then cast as a 20 mil film (wet) on a polyethylene sheet and dried. The resulting brittle film was ground to —60 mesh to yield a powder which exhibited only a slight odor of orange oil, but which released orange oil readily on contact with water.

EXAMPLE 3

The orange oil containing powder of Example 2 was blended with a commercial detergent (sodium dodecylbenzene sulfonate) at a level of 5% of the detergent. When the detergent was added to hot water, the orange oil odor was immediately apparent.

EXAMPLE 4

Example 2 was repeated using citral in place of orange oil. A detergent composition prepared with citral containing polymer in accordance with Example 3, immediately gave off a citrus like odor when added to hot water.

EXAMPLE 5

The citral-containing polymer of Example 4 (without detergents) was pulverized to —325 mesh in a hammer mill. The micropulverized powder was milled with a saponified coconut oil soap base at a level of 1 lb. of powder to 9 lbs. of the soap. The soap was extruded and stamped into cakes. On use of the soap cake for hand washing, the citral odor was evident on the hands. This effect persisted through the life of the soap cake.

EXAMPLE 6

Example 1 was repeated with the exception that 1180 g. of potassium hydroxide dissolved in 2 gallon of water was employed for neutralization.

EXAMPLE 7

Examples 2–5 were repeated using, however, the polymer of Example 6. Equivalent results were obtained.

EXAMPLE 8

Into a 30-gallon reactor was charged 40 lbs. of hydroxyethyl methacrylate, 1 lb. of methacrylic acid, 120 lbs. of methanol and 0.05 lb. of t-butyl peroctoate. The reactor was heated to 85° C. and allowed to stir 5 hours to effect polymerization. The polymer was isolated by precipitation from the alcohol solution with water, and allowed to dry. A yield of 37 lbs. was obtained. The polymer was re-dissolved in methanol to provide a 10 weight percent solution. To the solution was added 1 liter of 10% ammonium hydroxide, and the solution was spray-dried to provide a water soluble powder suitable for entrapment of flavors, fragrances, drugs, pesticides, etc., of the types set forth above, e.g., using 10% of additive with the copolymer.

EXAMPLE 9

Strong coffee was brewed by slurrying 15 g. of ground coffee in 75 cc. of water and heating to the boiling point. The coffee solution was filtered from the grounds, and 2 g. of the polymer of Example 8 was dissolved in the solution. The solution was then evaporated to dryness in a rotary vacuum apparatus to yield a brittle film which was finely ground. On addition of the powder to boiling water, a beverage was obtained which more nearly retained the flavor of fresh percolated coffee than the usual commercial "instant" coffee.

EXAMPLE 10

Into a 30-gallon reactor was changed 40 lbs. of hydroxyethyl methacrylate, 3 lbs. of dimethylaminoethyl methacrylate, 120 lbs. of methanol and 0.05 lb. of diisopropyl percarbonate. The reactor was heated to 75° C. and was stirred 7 hours to effect polymerization. The polymer was isolated by precipitation with water, and dried. A yield of 35 lbs. was obtained. 10 grams of the polymer was dissolved in 90 g. of 0.1 N HCl and the pH was adjusted to 4.5 with dilute sodium hydroxide. To the solution was added 3.5 g. of a mixture of lipolytic and protease enzymes, and the solution was dried at 25° C. in vacuo to provide a film having the enzymes trapped therein.

The film was ground and dry dispersed in an amount of 10% in a commercial detergent composition, specifically Fab, a mixture of 14 to 18 carbon atom alkyl alcohols, 10–18 carbon atom linear alkane sulfonates, potassium xylene sulfonate and tetra potassium pyrophosphate.

On aging it was noted that enzyme activity was maintained at a high level when the detergent containing the entrapped enzymes was added to water. Thus, entrapping the enzymes in the polymer film serves to protect them from degradation during storage by the alkalinity of the detergent composition.

EXAMPLE 11

Example 2 was repeated replacing the orange oil by artificial strawberry flavor. 10 parts of the strawberry flavor containing powder was blended with 10 parts of sugar, 3 parts of citric and 4 parts of sodium bicarbonate to produce a powder which when added to water dissolved to form a sparkling clear, carbonated strawberry flavored beverage.

EXAMPLE 12

The procedure of Example 11 was repeated replacing the strawberry flavor by (a) an equal weight of lemon-lime flavor to produce a lemon-lime beverage and (b) by an equal weight of synthetic cherry flavor to produce a cherry flavor.

EXAMPLE 13

The procedure of Example 2 was repeated replacing the orange oil by an equal weight of vanillin. The resulting vanillin flavored powder was used in the preparation of dry cake mixes.

EXAMPLE 14

The procedure of Example 2 was repeated using an equal weight of biacetyl in place of the orange oil to produce a powder providing flavor enhancement when used in dry cake mixes and in oleomargarine.

EXAMPLE 15

The polymer of Example 8 was dissolved in methanol to form a 7 weight percent solution. The solution was divided into 3 portions. To portion No. 1 was added a pine fragrance at a level of 10% of the polymer content. To portion No. 2 at the same level there was added a "new mown hay" fragrance and to portion No. 3 a lilac fragrance was adedd at the same level. The three solutions were then spray dried to provide powders containing the respective fragrances. These powders were suitable for incorporation into soap cakes in the manner described in Example 5 and at a level of 1 pound of entrapped fragrance powder to 10 pounds of soap powder. Soap thus treated when extruded and stamped into cakes retained the fragrance for the life the soap.

EXAMPLE 16

The polymer of Example 1 was dissolved in ethanol to provide a 10 weight percent solution. The solution was divided into four 1000 gram portions and 20 grams of an enzyme preparation added to each. The enzyme preparations used were (a) Rhozyme-S (Rohm & Haas) a diastatic enzyme; (b) Rhozyme 33 which is α-amylase; (c) Lipase B, a lipolytic enzyme; and (d) Rectinol S9L, a peptic enzyme.

Each of the four solutions was evaporated to dryness and ground to provide entrapped enzymes suitable for compounding into commercial detergent preparations based on non-ionic and/or anionic detergent materials.

EXAMPLE 17

The polymer of Example 1 was dissolved in a 50:50 methanol/water mixture to provide a solution containing 15% solids. In 100 g. of the solution was dissolved 5 g. of sodium acetyl salicylate (aspirin). The solution was dried as a thin film on a rotating evaporator and the dried film was granulated. The powder was pelletized into 250 mg. tablets with a tableting press. The tablets, containing 62.5 mg. of aspirin swelled, but did not dissolve in 0.1 N HCl solution, but were soluble at a pH above 5.5 such as is encountered in the intestinal tract.

EXAMPLE 18

Example 17 was repeated using the polymer of Example 10. The resulting tablets containing aspirin were soluble in the acidic environment of the stomach, but only swelled slightly in water at a pH above 5.5.

EXAMPLE 19

Example 17 was repeated using amobarbitol sodium in place of aspirin. Equivalent results were obtained.

EXAMPLE 20

Example 17 was repeated using prednisone, an antiinflammatory agent. Equivalent results were obtained.

EXAMPLE 21

The polymer of Example 1 was dissolved in ethanol to provide a solution containing 15% solids. In 100 grams of the solution were dissolved 3 grams of penicillin and the solution dried as a thin film and treated as in Example 20 to produce tablets containing the penicillin and polymer.

EXAMPLE 22

The polymer of Example 10 was dissolved in ethanol to provide a solution containing 10% solids. In 100 grams of the solution was dissolved 1 gram of 2,4-dichlorphenoxy acetic acid and the solution dried as a thin film and granulated. The granulated powder was suitable as a source of the herbicide.

EXAMPLE 23

The polymer of Example 10 was dissolved in ethanol to provide a solution containing 15% solids. In 100 grams of the solution was dissolved 3 grams of parathion and the solution dried as a film and granulated. The granulated powder was suitable for use in applying parathion to plants and to the soil.

EXAMPLE 24

The procedure of Example 23 was repeated replacing the parathion by phenyl mercuric acetate to provide a fungicidal dry powder.

The water soluble polymers are also useful to entrap vitamins. Thus, there can be entrapped thiamine, riboflavin, nicotinamide, pantothenic acid, pyridoxine, biotin, inositol, p-aminobenzoic acid, cyanocobalamin, ascorbic acid, vitamin $K_1$, $K_5$, $K_6$ and $K_7$, alcohol soluble vitamins such as vitamin A, vitamins $D_1$, $D_2$ and $D_3$, and vitamin E.

EXAMPLE 25

To 100 grams of a 10% solution of the polymer prepared in Example 10 in water there was added 2 grams of riboflavin phosphate. The solution was dried as a film and granulated. The product was readily soluble in water and provided a source of vitamin $B_2$.

In place of riboflavin in this example there can also be used the same amount of ascorbic acid or nicotinamide to provide a stable water soluble source thereof.

As used in the claims the term drugs is intended to include vitamins.

The materials entrapped in the water soluble hydroxyalkyl, acrylate or methacrylate polymer can be either solids or liquids and numerous examples of both solids and liquids are set forth supra.

As used in the claims the term detergent is intended to include soaps.

What is claimed is:

1. A powdered, dry composition consisting essentially of a detergent selected from group consisting of anionic, nonionic and cationic detergents and a solid, hydrophilic water soluble polymer of a hydrophilic hydroxyalkyl acrylate or methacrylate having entrapped therein a solid or liquid agent, said composition being adapted to release the entrapped agent upon contact with water by virtue of the dissolution of the water soluble polymer in water, said entrapped solid or liquid agent being a fragrance from about 0.1–35% based on the weight of the polymer, said polymer composition protecting the entrapped fragrance from atmospheric oxygen and preventing diffusion and loss thereof.

2. A composition according to claim 1 wherein the water soluble polymer, is a copolymer of a member of the group consisting of hydroxyethyl acrylate, hydroxypropyl acrylate, hydroxyethyl methacrylate and hydroxypropyl methacrylate with up to 20% of a water solubilizing copolymerizable monomer selected from the group consisting of (1) alkali metal and ammonium salts of a polymerizable organic acid and (2) strong acid salts of polymerizable organic amines, said water solubilizing monomer units being present in the copolymer in sufficient amounts to render the copolymer completely soluble in water.

3. A composition according to claim 2 wherein said copolymerizable monomer is ethylenically unsaturated.

4. A composition according to claim 3 wherein the acrylate or methacrylate is hydroxyethyl methacrylate and said copolymerizable monomer is the salt of a polymerizable organic acid.

5. A composition according to claim 3 wherein the acrylate or methacrylate is hydroxyethyl methacrylate and said copolymerizable monomer is a salt of an organic amine.

6. A composition according to claim 1 wherein the detergent is an anionic detergent and the anionic detergent is soap.

References Cited

UNITED STATES PATENTS

| | | | |
|---|---|---|---|
| 2,702,277 | 2/1955 | Kinney | 252—89 |
| 3,275,561 | 9/1966 | Pye et al. | 252—89 |
| 3,254,028 | 5/1966 | Wixon | 252—89 |
| 3,301,829 | 1/1967 | Woodward | 252—DIG. 2 |

LEON D. ROSDOL, Primary Examiner

W. E. SCHULZ, Assistant Examiner

U.S. Cl. X.R.

252—DIG. 2, 403, 522